US 6,577,267 B1

(12) United States Patent
Moedl et al.

(10) Patent No.: US 6,577,267 B1
(45) Date of Patent: Jun. 10, 2003

(54) DEVICE AND METHOD FOR CONTACTLESSLY MEASURING SPEED ON SURFACES

(75) Inventors: Stefan Moedl, Hilpoltstein (DE); Norbert Weber, Weissenohe (DE); Josef Sauerer, Herzogenaurach (DE)

(73) Assignee: Fraunhofer-Gesellschaft Zur Forderung, Munich (DE)

(*) Notice: Subject to any disclaimer, the term of this patent is extended or adjusted under 35 U.S.C. 154(b) by 0 days.

(21) Appl. No.: 09/700,835

(22) PCT Filed: Mar. 27, 2000

(86) PCT No.: PCT/EP00/02682

§ 371 (c)(1),
(2), (4) Date: Nov. 17, 2000

(87) PCT Pub. No.: WO00/60372

PCT Pub. Date: Oct. 12, 2000

(30) Foreign Application Priority Data

Mar. 30, 1999 (DE) .......................................... 199 14 486

(51) Int. Cl.⁷ .............................................. G01S 13/60
(52) U.S. Cl. ...................... 342/109; 342/104; 342/115; 342/117; 342/192; 342/195; 342/196; 702/142; 702/143; 367/89; 367/90; 367/99; 367/107
(58) Field of Search ................................ 342/104, 107, 342/109, 115, 118, 165, 173–175, 192–197; 367/89–116; 73/488, 514.39, 597; 324/160; 702/104, 127, 142–149

(56) References Cited

U.S. PATENT DOCUMENTS

| 4,231,039 A | 10/1980 | Fritzlen et al. |
| 4,722,222 A | * 2/1988 | Purdy et al. ................... 73/597 |
| 4,757,714 A | 7/1988 | Purdy et al. |

FOREIGN PATENT DOCUMENTS

| DE | 35 40 426 A | 5/1986 |
| DE | 3909644 A1 | * 9/1990 | ........... G01S/13/60 |
| DE | 44 28 663 A | 2/1996 |
| DE | 195 01 228 A | 8/1996 |
| EP | 0 831 336 A | 3/1998 |
| GB | 2 276 055 A | 9/1994 |

* cited by examiner

Primary Examiner—Bernarr E. Gregory
(74) Attorney, Agent, or Firm—Dougherty, Clements & Hofer (57) ABSTRACT

A device for non-contractual measurement of the speed of an object moving over a surface comprises a means for radiating a signal of fixed frequency at an angle onto the surface in or against the direction of motion, said angle being variable by the movement of the object, and for receiving a Doppler-shifted signal reflected at the surface. A means is provided for combining a plurality of reflected Doppler-shifted signals, which are received in temporal succession, so as to produce a combined spectrum. The device for non-contractual speed measurement additionally comprises a means for detecting from the combined spectrum the spectral portion having the highest or lowest frequency and exceeding a predetermined signal power, and a means for deducing the speed from the frequency of the detected spectral portion.

24 Claims, 5 Drawing Sheets

DEVICE AND METHOD FOR CONTACTLESSLY MEASURING SPEED ON SURFACES

BACKGROUND OF THE INVENTION

1. Field of the Invention

The present invention relates to a device and a method for non-contractual measurement of the speed of an object moving over a surface, and in particular to a device and a method for non-contractual speed measurement over surfaces by means of the Doppler principle making use of microwave or ultrasonic sensors, in particular for joggers or inline skaters.

2. Description of Prior Art

Within the last few years, performance diagnostic has become increasingly common in the field of leisure-time sports. Instruments which were previously the preserve of top sportsmen alone have recently been used more and more by the masses of leisure-time sportsmen. The heart-rate measuring unit, which, in view of the high price, was exclusively used by top sportsmen a few years ago, whereas it is now used by a large number of leisure-time sportsmen for personal health control, can be mentioned as an example in this connection.

In addition to health control there is, however, also an increasing need for assessing the respective performance achieved. In the case of cycling, this is done e.g. by indicating in the bicycle tachometer the speed and the distance covered. In the case of some other kinds of sport, e.g. jogging, inline skating and also downhill skiing or cross-country skiing, this information is not provided due to non-existing measurement methods or measurement methods which entail major disadvantages.

All the hitherto known methods for non-contractual speed measurement in the field of leisure time are either very susceptible to faults and inaccurate, when the methods in question are mechanical methods, or they entail restrictions with respect to the sensors used, e.g. microwave sensors or ultrasonic sensors.

A method of non-contractual speed measurement, in particular for skiers, is disclosed in U.S. Pat. No. 4,757,714. This method makes use of a speed sensor and of a data display fixed to a helmet. A transmitter is fixed to one ski and transmits ultrasonic or electromagnetic waves in the direction of the stationary medium over which a skier moves. An element of the same transmitter or a separate transducer detects waves reflected from the stationary medium. A computer calculates the speed of the skis from the Doppler shift of the reflected signal and activates a display unit so as to display the speed.

This kind of non-contractual speed measurement over surfaces by means of the Doppler principle is problematic insofar as the Doppler-shifted frequency depends on the angle between the ultrasonic sensor or the microwave sensor and the surface in motion relative to the sensor, the speed to be measured being the relative speed between the surface and the sensor.

In the prior art it is known to use two sensors, which are displaced by 90° relative to one another, so as to compensate the angular dependency of the sensors. This kind of arrangement is known as Janus arrangement. The disadvantage of this arrangement is, on the one hand, that it cannot be employed in all cases of use, since the two sensors have to be fixed at an angle of 90° to the direction of motion. This mode of an arrangement is not possible for joggers, by way of example. In addition, the use of two sensors is necessary, which will, on the one hand, entail higher costs and, on the other hand, fluctuations or drifts, respectively, of the sound will occur more easily, particularly for a transducer pointing backwards; such drifts adversely affect the accurate measurement of high speeds.

In a further known system for non-contractual speed measurement, which is described in DE 19501228, a sensor is used which exhibits a broad radiation characteristic so as to keep the influence of the angular dependency relative to the surface low. As disclosed in this publication, the influence of the angular dependency relative to the surface can, however, only be kept low if the irradiation angle is smaller than half the aperture angle of the sensor radiating the signal. The disadvantage of this known speed measurement are the necessary sensors which must exhibit a broad radiation characteristic. The frequencies of the sensors which have to be used as well as the maximum radiant power are determined by the Federal Bureau for Telecommunications. This means that if a sensor has a large aperture angle, this being the kind of sensor required according to DE 19501228, it will only be possible to obtain a limited power density and, consequently, maximum range of the sensor in view of the broad radiation characteristic. This means, in other words, that the maximum possible range can be achieved by a very narrow radiation characteristic.

For applications in the field of leisure-time sports, e.g. jogging or inline skating, the sensor is normally provided one meter above the ground so that a high radiant power density is required. The speed measurement system disclosed in DE 19501228 is, however, often not able to achieve such a radiant power density in view of the comparatively large radiation angle and the maximum admissible radiant power. It follows that the method described in DE 19501228 is particularly suitable for ski speed measurement when the sensor is provided in or on the ski, whereas in the case of other leisure-time sport activities, such as jogging or inline skating, where the sensor is arranged at a comparatively large distance from the ground, this measurement method will normally not provide any useful measurement results. A further disadvantage of the measurement system described in DE 19501228 is that sensors having a large radiation angle are normally much more expensive and much less easily available than narrow-cone sensors.

SUMMARY OF THE INVENTION

It is the object of the present invention to provide a device and a method for non-contractual measurement of the speed of an object moving over a surface, which provide, on the one hand, measurement results with high precision and, on the other hand, a high flexibility with regard to the field of use.

According to a first aspect of the present invention this object is achieved by a device for non-contractual measurement of the speed of an object moving over a surface which comprises a means for radiating a signal of fixed frequency at an angle onto the surface in or against the direction of motion, the angle being variable by the movement of the object, and for receiving a Doppler-shifted signal reflected at the surface. Furthermore, a means is provided for combining a plurality of reflected Doppler-shifted signals, which are received in temporal succession, so as to produce a combined spectrum. The device for non-contractual speed measurement additionally comprises a means for detecting from the combined spectrum the spectral portion having the highest or lowest frequency and exceeding a predetermined signal power, and a means for deducing the speed from the frequency of the detected spectral portion.

According to preferred embodiments of the present invention, a means is provided for down-converting to the baseband the received Doppler-shifted signal which has been reflected at the surface. When the received signal is down-converted to the baseband, the spectral portion having the highest frequency and exceeding a predetermined signal power is detected independently of the radiation direction of the sensor. Otherwise, e.g. when the received signal is converted to an intermediate frequency, the spectral portion having the highest frequency will be detected when the sensor radiates in the direction of motion, and the spectral portion having the lowest frequency will be detected when the sensor radiates against the direction of motion.

According to the present invention, a sensor having a narrow radiation characteristic can be used, which is mounted such that it either faces the direction of motion or faces away from the direction of motion. When the surface over which an object moves is irradiated, a spectral portion of the Doppler-shifted signal will occur due to the diffuse reflection of the sensor signal at the surface, this spectral portion being, however, dependent on the irradiation angle. This spectral portion is the highest frequency portion appearing in the Doppler spectrum, this frequency portion constituting then a direct measure for the speed. In order to compensate the dependence of the output signal on the angle between the sensor and the surface, averaging over a plurality of transmitting intervals is carried out according to the present invention.

A natural change of angle will occur in the case of a preferred field of use of the present invention, viz. speed detection in the field of leisure-time sports, e.g. jogging or inline skating, due to the movement of the leisure-time sportsman who carries the transmitter. By means of the averaging over time according to the present invention this natural change of angle, which results from the circumstance that the sensor is not rigidly mounted at a fixed angle relative to the surface, is utilized for detecting a signal component that extends almost parallel to the surface. This signal component mirrors the actual speed component. This averaging over a plurality of successive measurement periods and the utilization of the natural movement of the sensor, which results from the use of the sensor, leads to a temporal expansion of the radiation angle without any loss of range. Such a loss of range would occur if sensors with broader radiation angles were used.

For evaluating the combined spectrum, which is obtained from the individual spectra of the received, reflected, Doppler-shifted spectra, the spectral portion having the highest frequency or the "falling edge" of the combined spectrum is ascertained. On the other hand, the spectral portion having the lowest frequency or the "rising edge" of the Doppler spectrum is detected when the sensor radiates against the direction of motion and when the received signal is not converted to the baseband but e.g. to an intermediate frequency. The respective spectral portion can be detected by means of traditional spectral analysis methods or by a Fourier transform. Furthermore, the method described in DE 19501228 can be used for obtaining the respective spectral portion from the combined spectrum.

According to preferred embodiments of the present invention, the predetermined signal power which is used for detecting the spectral portion having the highest and the lowest frequency, respectively, is set on the basis of specific properties of the means for radiating and receiving, these specific properties including preferably the 1/f noise of the means for radiating and receiving, i.e. of the sensor. Furthermore, preferred embodiments of the present invention include a means for correcting the deduced speed so as to compensate a speed-dependent curve shape of the combined spectrum. This speed-dependent correction is advantageous insofar as inaccuracies caused by the varying falling or rising edge of the spectrum are compensated for as the speed increases. This speed-dependent correction can specially be adapted to each type of sensor. Due to the continual motion imparted to the sensor by the person carrying the sensor, there will be fluctuations in the distance between the sensor and the surface on which this person is moving. Signal level differences resulting from this varying distance can be compensated for by an amplifier with automatic gain control.

According to a second aspect the object underlying the present invention is achieved by a method for non-contractual measurement of the speed of an object moving over a surface in the case of which a signal of fixed frequency is radiated at an angle onto the surface in or against the direction of motion, the angle being variable by the movement of the object. A Doppler-shifted signal reflected at the surface is received. The above-mentioned steps are repeated so as to produce a plurality of reflected Doppler-shifted signals received in temporal succession. The plurality of reflected Doppler-shifted signals received in temporal succession is combined so as to produce a combined spectrum. The spectral portion having the highest or lowest frequency and exceeding a predetermined signal power is detected from the combined spectrum, whereupon the speed is deduced from the frequency of the detected spectral portion.

It follows that the devices and methods according to the present invention permit non-contractual speed measurement over surfaces making use of standard sensors, microwave sensors or ultrasonic sensors having narrow transmit and receive characteristics, the measurement results provided by the present invention being extremely precise. The present invention additionally permits non-contractual speed measurement for leisure-time sports, e.g. jogging or inline skating, in the case of which such precise measurement has not been possible up to now.

Further developments of the present invention are disclosed in the dependent claims.

BRIEF DESCRIPTION OF THE DRAWINGS

In the following, preferred embodiments of the present invention will be explained in detail making reference to the enclosed drawings, in which.

DESCRIPTION OF PREFERRED EMBODIMENTS OF THE INVENTION

Figure 1:
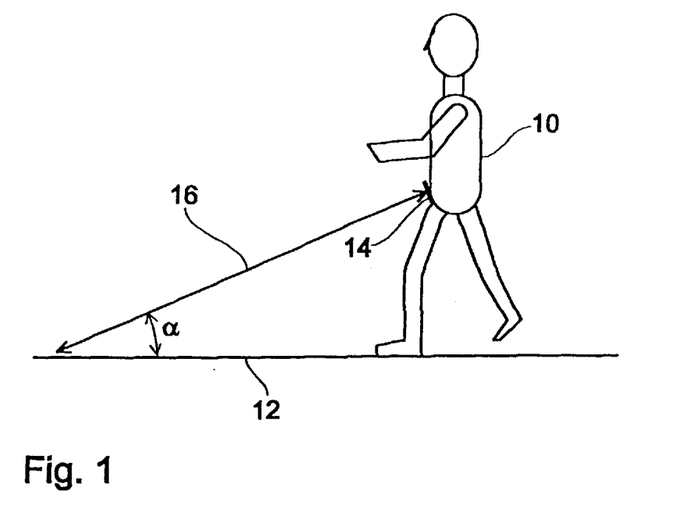
FIG. 1 shows schematically the use of a speed measurement device according to the present invention.
Figure 2:
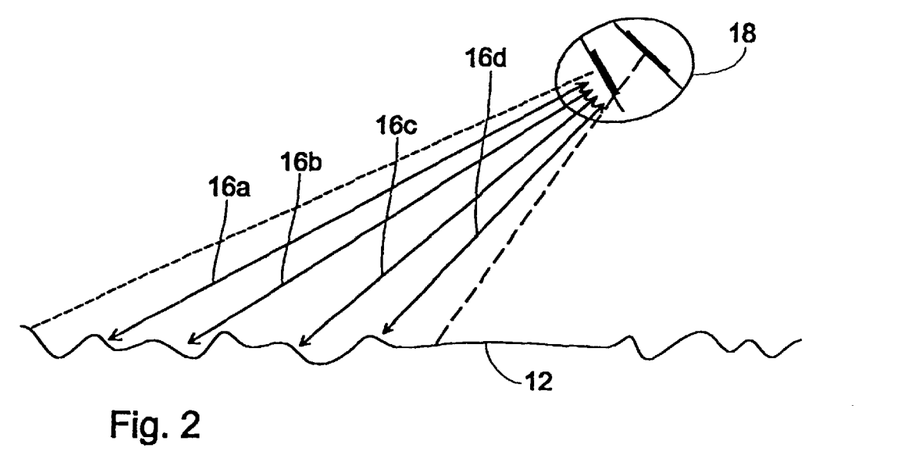
FIG. 2 shows a schematic representation for illustrating the natural change of angle between the sensor and the surface, this natural change of angle resulting from the use of the speed measurement device.

FIG. 1 shows a jogger 10 moving over a surface 12. The jogger carries, e.g. on a belt or via an arbitrary other fastening, the speed measurement device 14 according to the present invention, which, in the representation according to FIG. 1, is arranged such that the sensor thereof radiates in the direction of motion. Alternatively, it would likewise be possible to arrange the speed measurement device 14 on the jogger's back in such a way that the sensor radiates against the direction of motion. The running movement of the jogger 10 causes a natural movement of the sensor of the speed measurement device 14 and this, in turn, results in a change of the angle α between the signal 16 radiated by the sensor and the surface 12 on which the jogger 10 is running. This variation of angle at which the signal emitted by the sensor impinges on the surface 12 is schematically shown in FIG. 2 by signals 16a, 16b, 16c and 16d. Another schematic representation shows, in circle 18 of FIG. 2, two different positions of the speed measurement device 14 and, consequently, of the sensor. When several successive measurements are carried out one after the other, this will lead to a temporal expansion of the radiation angle which is caused by the natural tilting movement of the sensor, as can be seen from FIG. 2. When the plurality of temporally successive measurements is evaluated in common so as to determine the speed of the jogger 10 by forming a combined spectrum of this plurality of measurements, it will be possible to achieve a compensation of the dependence of the sensor signal on the angle between the sensor and the surface.

Figure 3:
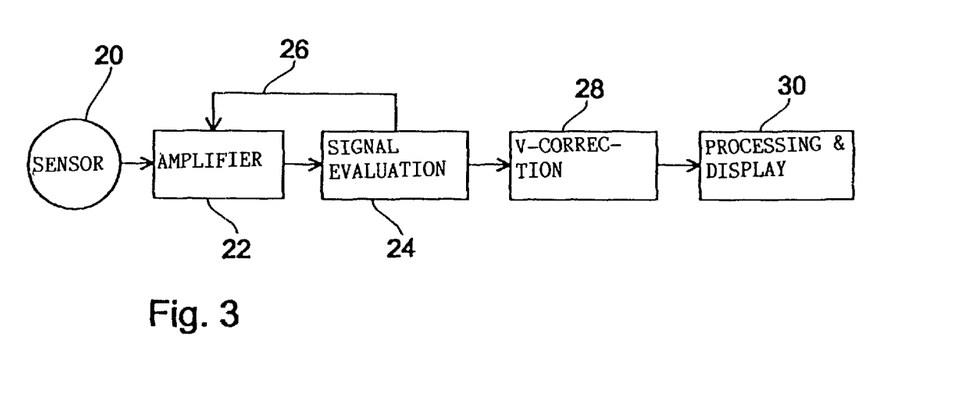
FIG. 3 shows a rough schematic representation of an embodiment of a speed measurement device according to the present invention.

FIG. 3 shows a rough schematic block diagram of an embodiment of the device for non-contractual speed measurement according to the present invention. A sensor 20 is connected to a signal evaluation unit 24 via an amplifier 22. The sensor may be an ultrasonic sensor operating e.g. in a frequency range of from 40 kHz to 200 kHz, or a microwave sensor operating e.g. in a range of from 5 GHz to 30 GHz. The amplifier 22 may be an amplifier with automatic gain control, as indicated by arrow 26, so as to compensate fluctuations of the distance between the sensor 20 and the surface. The signal evaluation unit 24 is coupled to a v-correction unit 28 in which a speed correction is carried out, as will be explained in detail hereinbelow making reference to FIGS. 6 and 7. Finally, a processing and display unit 30 is provided.

Figure 4:
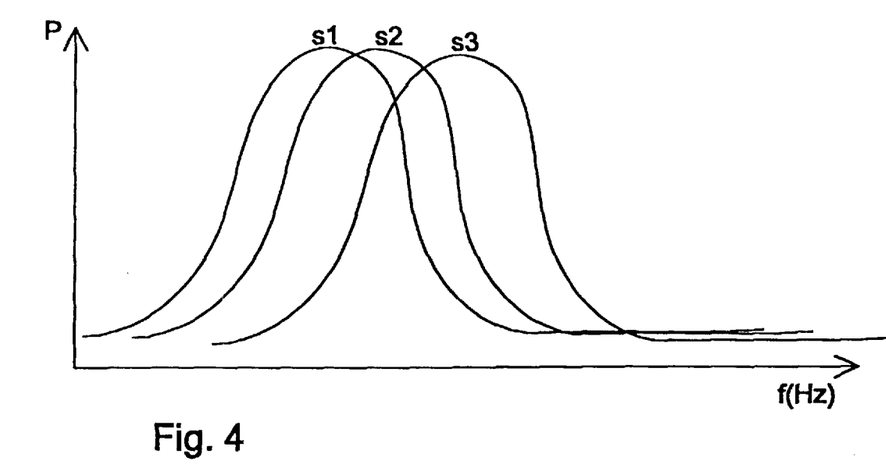
FIG. 4 shows a diagram which shows the spectra of three reflected signals received in temporal succession.

In the following, the mode of operation of the speed measurement device according to the present invention will be explained in detail. By means of the sensor 20 a respective signal is radiated onto the surface and the resultant signal reflected at the surface is received by the sensor 20 and supplied via the amplifier 22 to the signal evaluation unit 24. This received signal is preferably down-converted to the baseband or, alternatively, converted to an intermediate frequency. This process is repeated several times according to the present invention, the respective signals received being stored e.g. in the signal evaluation unit 24. Each of the received Doppler-shifted signals which has been reflected at the surface has a spectrum which depends on the irradiation angle between the signal and the surface; as has been explained above, this irradiation angle changes due to the movement of e.g. a jogger. In order to illustrate this, FIG. 4 shows three spectra s1, s2 and s3 resulting from three signals received in the case of different irradiation angles.

According to the present invention, the signals received in temporal succession are used for averaging over several periods. In the case of jogging averaging can be carried out e.g. over several seconds, e.g. over 8 FFTs, since the speed is here almost constant over several seconds when a low acceleration is taken as a basis. In other fields of use, averaging can, alternatively, be carried out over a different period of time, depending on the accelerations to be expected.

Figure 5:
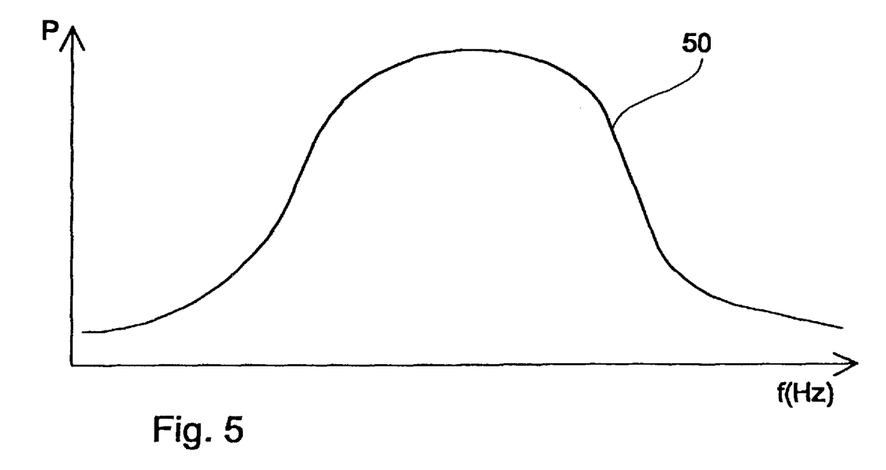
FIG. 5 shows a diagram which shows the combination of the spectra shown in FIG. 4.

According to the present invention, the plurality of temporally successive signals, which are used in common for measuring the speed, are combined so as to produce a combined spectrum. FIG. 5 shows, by way of example, a combined spectrum 50 which is obtained by adding up the individual spectra s1, s2, and s3 shown in FIG. 4. As can clearly be seen in FIG. 5, an expansion of the resultant combined spectrum is caused by summation of the individual spectra, since, due to the natural movement of the jogger, the angle of the sensor does not remain constant with respect to the direction vertical to the surface. The combined spectrum 50 shown in FIG. 5 is now used for evaluating the speed. In so doing, the highest or the lowest frequency portion, which exceeds a predetermined power or energy level, will be evaluated, as has been explained hereinbefore.

The spectral portion having the highest or the lowest frequency and exceeding a predetermined signal power can, for example, be detected from the combined spectrum in the manner described in DE 19501228 for ascertaining a spectral portion having the highest or the lowest frequency and exceeding a predetermined signal power. Alternatively, arbitrary known methods making use of a spectral analysis or a Fourier transform can be used for detecting the respective frequency portion.

It is essentially the noise, especially that of the sensor, which contributes to the predetermined signal power, which must be exceeded by the spectral portion associated with the speed to be detected, a frequency portion occurring in the combined spectrum being assessed to be a direct measure of the speed e.g. when a plurality, e.g. four, of successive values of the spectrum exceed the noise level by e.g. 3 dB. The speed is then deduced in the manner known from the frequency of this spectral portion, which has been detected in the signal evaluation unit 24 (FIG. 3), and preferably displayed on a display unit. The display can be effected e.g. remote from the speed measurement device on the user's wrist or, alternatively, in any other suitable manner, the display unit being controlled by the device for non-contractual speed measurement according to the present invention.

The processing and display unit 30 can additionally be used for detecting the running time so that it will be possible to calculate the distance covered. Furthermore, the maximum speeds can be stored and the average speed can be calculated from these stored maximum speeds; these additional parameters can be displayed on the display unit as required. In addition, a means for detecting the heart rate can be provided so that it will be possible to display this parameter on the display unit as well.

Figure 6:
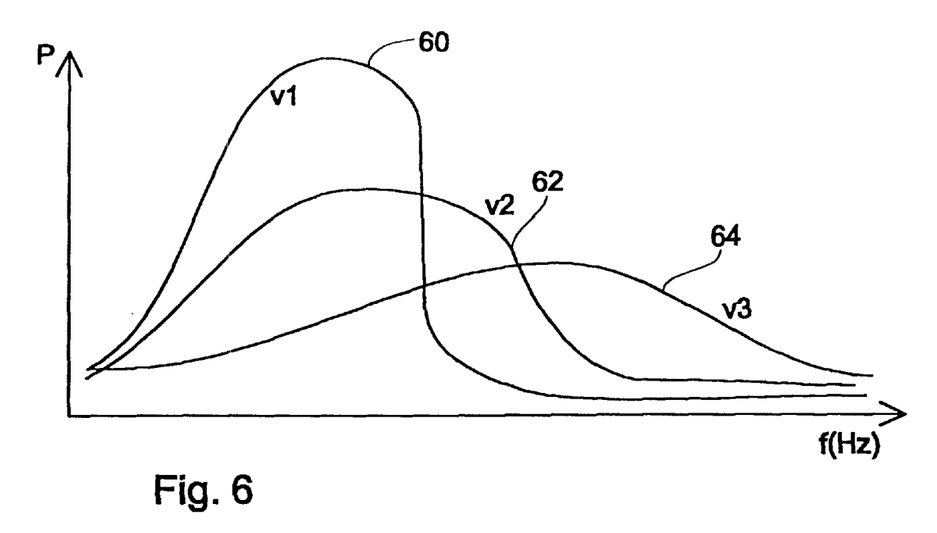
FIG. 6 shows a diagram which shows the resultant combined spectra at different speeds.

Making reference to FIGS. 6 to 11, it will be explained in the following how a speed-dependent correction can be implemented and how the influence of the sensor-specific l/f noise can be compensated according to the present invention. In FIG. 6 three combined spectra 60, 62 and 64 are shown, which are obtained at increasing speeds v1, v2 and v3. As can be seen from FIG. 6, the decline of the respective frequency spectrum varies as the speed increases.

Figure 7:
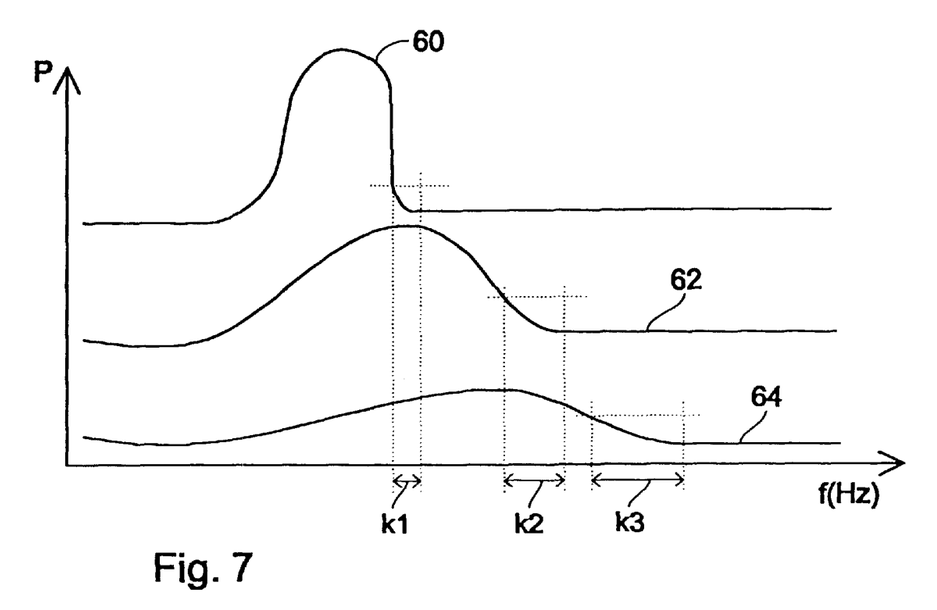
FIG. 7 shows a further representation of the spectra shown in FIG. 6 for illustrating the speed-dependent correction of the speed deduced from the spectra.

The spectra 60 to 64 shown in FIG. 6 are shown, slightly reduced in size, in FIG. 7 one on top of the other. If a threshold of e.g. 3 dB above the noise level is assumed for determining the spectral portion having the highest frequency and exceeding a specific threshold, a speed-dependent error will occur due to the decline characteristic of the respective frequency spectrum; this error must be corrected. In this connection, it should be pointed out that the correct speed will be obtained when the frequency of the respective foot of the spectra shown in FIG. 7 is used for deducing the speed. It follows that a correction has to be carried out when the speed is being deduced; this correction is effected in the speed correction unit 28. Due to the steeper decline of the frequency spectrum, a smaller correction k1 will be necessary for the spectrum 60, whereas the correction factor for the spectra resulting as the speed increases becomes greater, as can be seen from the correction factors k2 and k3 in FIG. 7. These correction factors can e.g. be stored in the device for non-contractual speed measurement according to the present invention and they can be used for correction when the speed is being determined.

Figure 8:
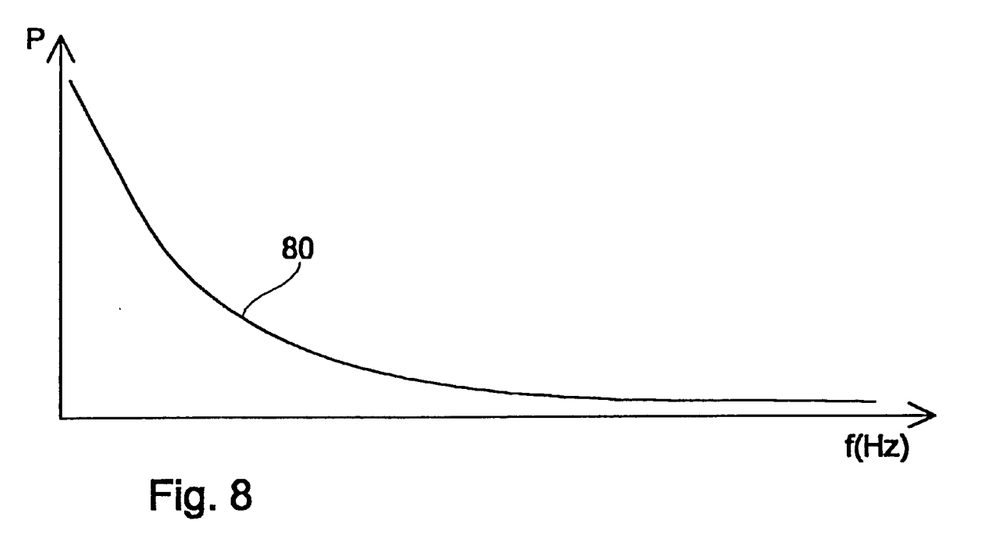
FIG. 8 shows a diagram which shows the 1/f noise of a sensor.

In addition, a strong l/f noise will occur in the frequency range in which the sensors of the device for non-contractual speed measurement according to the present invention operate; this noise can preferably be taken into account by carrying out a dynamic calculation of the noise level. FIG. 8 shows at 80 the l/f noise of the sensor, which is additively superimposed on the signal spectrum.

Figure 9:
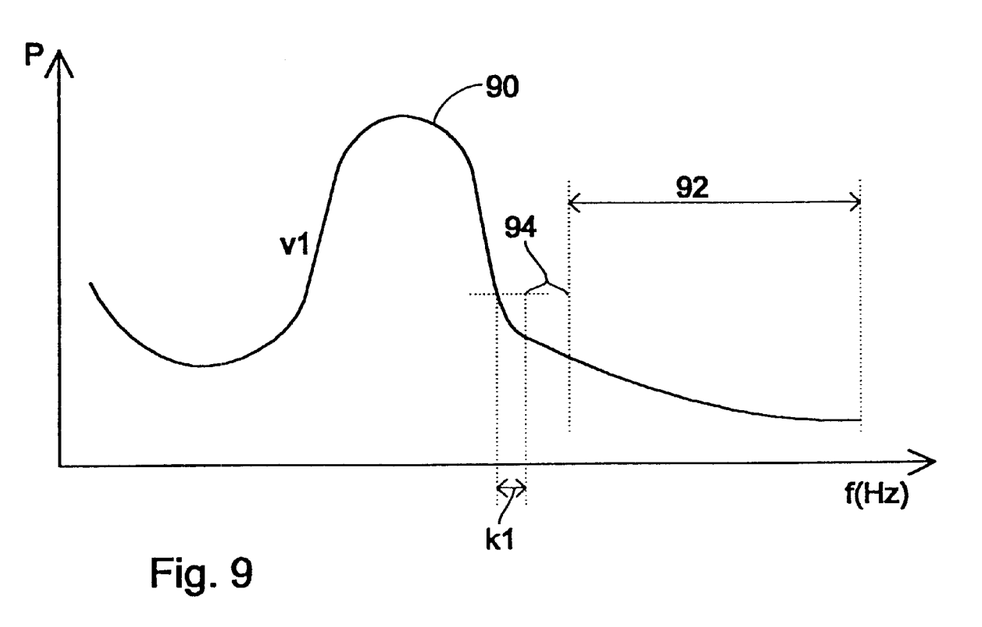
FIGS. 9 to 11 show combined spectra for different speeds having the 1/f noise of the sensor superimposed thereon.
Figure 10:
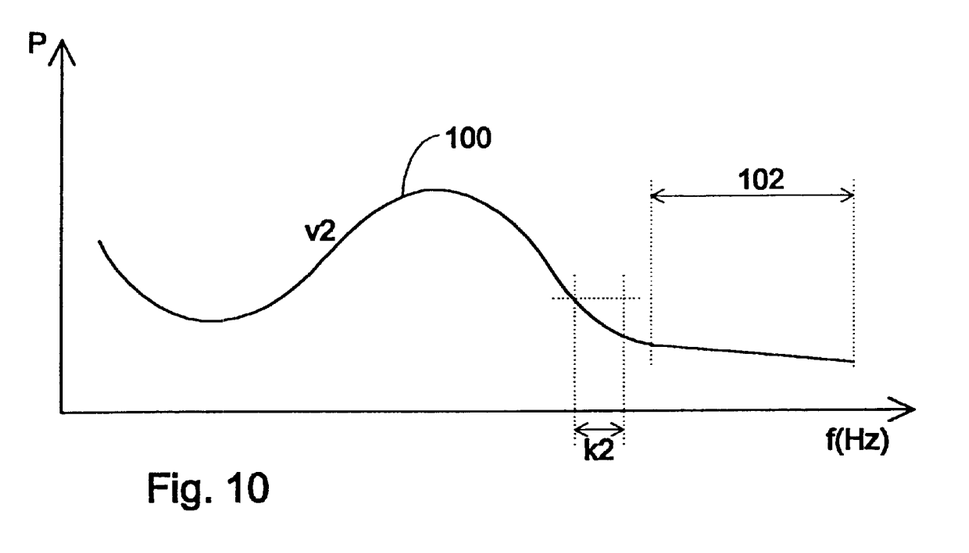
Figure 11:
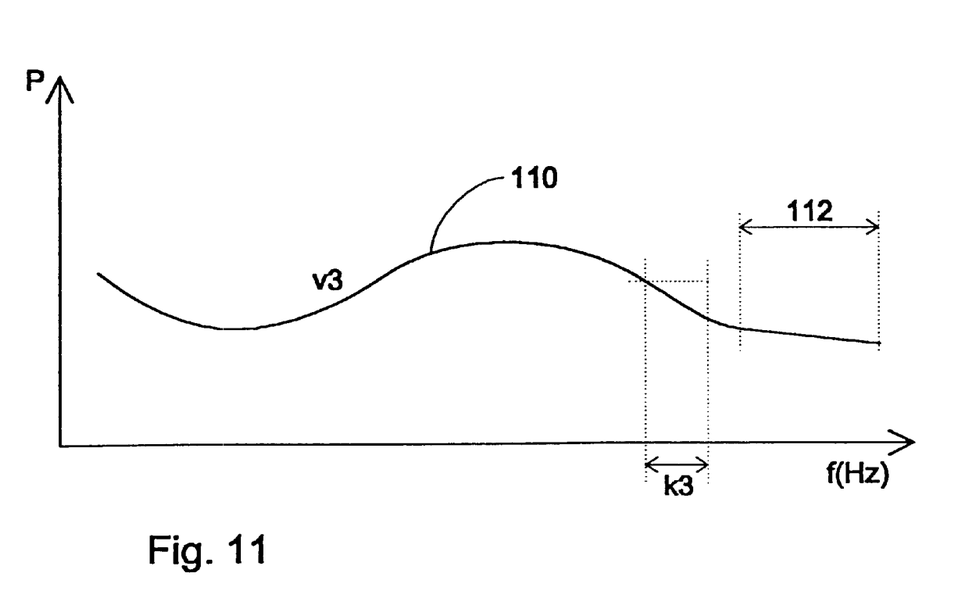

The resultant spectra for the speeds v1, v2 and v3 with a superimposed noise portion are shown in FIG. 9, 10 and 11. FIG. 9 shows the spectrum 90 for the speed v1, whereas in FIG. 10 the spectrum 100 for the speed v2 is shown and in FIG. 11 the spectrum 110 for the speed v3 can be seen. Reference numeral 92 in FIG. 9 stands for the section of the noise spectrum used for calculating the noise level, this area being designated by reference numeral 102 in FIG. 10 and by reference numeral 112 in FIG. 11.

According to preferred embodiments of the present invention, noise calculation in the frequency range is dynamically correlated with the instantaneous speed so as to take into account the l/f noise shown in FIG. 8, as will be explained hereinbelow. In so doing, the last speed determined is always taken as a reference for calculating the noise for the instantaneous speed. In this connection, it is assumed that the speed between two measurement cycles does not exceed a specific value. By means of the device for non-contractual speed measurement according to the present invention, the respective speed can be detected periodically in successive measurement cycles so as to display this speed on a display unit, as has been stated above. The part of the spectrum of a preceding measurement cycle which is now used for ascertaining the noise is the respective part which starts with a predetermined offset, e.g. 94 in FIG. 9, above the highest frequency portion detected in this preceding measurement cycle. It follows that the noise portion for the next measurement cycle is ascertained in the representation according to FIG. 9 by ascertaining the noise power over the section of the spectrum designated by reference numeral 92. The noise ascertained in this way is then used in the next measurement cycle for determining the predetermined signal power which must be exceeded by a spectral portion so as to deduce the speed therefrom.

If the acceleration between two measurement cycles exceeds a specific value, which may e.g. happen when the jogger starts running, the system will adjust itself to the new value after a few seconds. Although ultimate precision is not achieved by this method during this building-up process, this does not represent a problem with regard to the use in the field of leisure-time sports.

Although the correction of the speed-dependence of the curve shape of the spectra and the taking into account of the noise level, respectively, are described in FIGS. 7 to 11 with reference to the detection of the spectral portion having the highest frequency and exceeding a predetermined signal power, it is obvious that these principles are also applicable to the detection of the spectral portion having the lowest frequency and exceeding a predetermined signal power.

What is claimed is:

1. A device for non-contactual measurement of the speed of a living being moving over a surface, comprising:

a means for radiating a signal of fixed frequency at an angle onto the surface in the direction of motion or opposite to the direction of motion, said angle being varied by the movement of the living being, and for receiving a Doppler-shifted signal reflected at the surface;

a means for combining a plurality of reflected Doppler-shifted signals, which are received in temporal succession, so as to produce a combined spectrum;

a means for detecting from the combined spectrum the spectral portion having the highest or lowest frequency and exceeding a predetermined signal power; and a means for deducing the speed from the frequency of the detected spectral portion.

2. A device according to claim 1, wherein a means is provided for converting to the baseband the received Doppler-shifted signal which has been reflected at the surface.

3. A device according to claim 2, wherein said radiating means is provided for radiating the signal onto the surface opposite to the direction of motion, said detecting means being provided for detecting the spectral portion having the highest frequency.

4. A device according to claim 1, wherein said radiating means is provided for radiating the signal onto the surface in the direction of motion, said detecting means being provided for detecting the spectral portion having the highest frequency.

5. A device according to claim 1, wherein said radiating means is provided for radiating the signal onto the surface opposite to the direction of motion, said detecting means being provided for detecting the spectral portion having the lowest frequency.

6. A device according to claim 1, comprising in addition a means for setting the predetermined signal power on the basis of specific properties of the means for radiating and receiving.

7. A device according to claim 6, wherein the specific properties include the l/f noise of the means for radiating and receiving.

8. A device according to claim 1, comprising in addition a means for correcting the deduced speed so as to compensate a speed-dependent curve shape of the combined spectrum.

9. A device according to claim 1, wherein the means for detecting the spectral portion carries out a Fourier transform.

10. A device according to claim 1, wherein the means for detecting the spectral portion carries out a spectral analysis.

11. A device according to claim 1, wherein the means for radiating and receiving is an ultrasonic sensor or a microwave sensor.

12. A device according to claim 1, including in addition a means for detecting the time and a means for determining an average speed and a distance covered by the living being.

13. A device according to claim 1, including in addition a means for measuring a heart rate.

14. A device according to claim 1, including in addition a display means (30) for displaying the deduced parameters, the measured parameters, or both the deduced and measured parameters.

15. A method for non-contractual measurement of the speed of a living being moving over a surface, comprising the following steps:
   a) radiating a signal of fixed frequency at an angle onto the surface in the direction of motion or opposite to the direction of motion, said angle being varied by the movement of the living being;
   b) receiving a Doppler-shifted signal reflected at the surface;
   c) repeating steps a) and b) so as to produce a plurality of reflected Doppler-shifted signals received in temporal succession;
   d) combining the plurality of reflected Doppler-shifted signals received in temporal succession, so as to produce a combined spectrum;
   e) detecting from the combined spectrum the spectral portion having the highest or lowest frequency and exceeding a predetermined signal power; and
   f) deducing the speed from the frequency of the detected spectral portion.

16. A method according to claim 15, wherein the received signal is converted to the baseband after step b).

17. A method according to claim 16, wherein the signal is radiated onto the surface opposite to the direction of motion and the spectral portion having the highest frequency is detected.

18. A method according to claim 15, wherein the signal is radiated onto the surface in the direction of motion and the spectral portion having the highest frequency is detected.

19. A method according to claim 15, wherein the signal is radiated onto the surface opposite to the direction of motion and the spectral portion having the lowest frequency is detected.

20. A method according to claim 15, wherein an ultrasonic sensor or a microwave sensor is used for radiating and receiving in steps a) and b).

21. A method according to claim 20, wherein a predetermined signal power is used in step (e), said signal power beind determined taking into account specific properties of the sensor.

22. A method according to claim 21, wherein the specific properties of the sensor are the 1/f noise of said sensor.

23. A method according to claim 22, wherein steps a) to e) are run through periodically, the combined spectrum obtained in the respective previous run being used for the next run so as to ascertain the noise which is taken into account when the predetermined signal power is being ascertained.

24. A method according to claim 15, wherein after step e) an additional step of correcting the deduced speed is carried out so as to compensate a speed-dependent curve shape of the combined spectrum.

* * * * *